United States Patent [19]

Ohyabu

[11] 4,330,864
[45] May 18, 1982

[54] DOUBLE LAYER FIELD SHAPING SYSTEMS FOR TOROIDAL PLASMAS

[75] Inventor: Nobuyoshi Ohyabu, La Jolla, Calif.

[73] Assignee: General Atomic Company, San Diego, Calif.

[21] Appl. No.: 919,799

[22] Filed: Jun. 28, 1978

[51] Int. Cl.³ .............................................. G21B 1/00
[52] U.S. Cl. ..................................... 376/133; 376/142
[58] Field of Search ........................................ 176/3, 9

[56] References Cited

U.S. PATENT DOCUMENTS

| | | | |
|---|---|---|---|
| 3,692,626 | 9/1972 | Ohkawa | 176/3 |
| 3,778,343 | 12/1973 | Coppi et al. | 176/3 |
| 3,801,438 | 4/1974 | Ohkawa | 176/3 |
| 4,065,350 | 12/1977 | Sheffield | 176/3 |
| 4,087,322 | 5/1978 | Marcus | 176/3 |
| 4,145,250 | 3/1979 | Ohkawa et al. | 176/3 |
| 4,149,931 | 4/1979 | Christensen | 176/9 |

OTHER PUBLICATIONS

Trans. Ans (6/12–16/77), pp. 58–59, Powell et al., Maxamak and Multimak.
Fluid Physics (11/76), pp. 1–10, Nelson et al.
Proceedings of Utah Acad. of Sci., Arts, Let., vol. 50, part 2 (1973), pp. 1–11, Gardner et al.
Journal of Nuc. Mat. 63 (1976), 91–95, McCracken.
IEEE Pub. No. 77CH1267–4–NPS (10/25–28/77), pp. 814–816, Brown et al.
IEEE Pub. No. 75CH1097–5–NPS, (11/18–21/75), pp. 570–573, Schupp et al.
IEEE Pub. No. 75CH1097–5–NPS, (11/18–21/75), pp. 378–382, Allgeyer et al.
IEEE Pub. No. 75CH1097–5–NPS, (11/18–21/75), pp. 759–763, Davies et al.
IEEE Pub. No. 77CH1097–5–NPS, (11/18–21/75), pp. 1110–1113, Marcus et al.

*Primary Examiner*—S. A. Cangialosi
*Attorney, Agent, or Firm*—Fitch, Even, Tabin, Flannery & Welsh

[57] ABSTRACT

Methods and apparatus for plasma generation, confinement and control such as Tokamak plasma systems are described having a two layer field shaping coil system comprising an inner coil layer close to the plasma and an outer coil layer to minimize the current in the inner coil layer.

10 Claims, 12 Drawing Figures

CURRENT PROFILE

CURRENT PROFILE

CURRENT PROFILE

DOUBLE LAYER FIELD SHAPING SYSTEMS FOR TOROIDAL PLASMAS

The present invention is directed to methods and apparatus for confining and controlling plasmas, and, more particularly, to such methods and apparatus for maintaining high temperature toroidal plasmas.

Various methods and apparatus have been developed for generating and confining plasmas, which are ionized gases consisting of approximately equal numbers of positively charged ions and free electrons at high temperatures.

One general type of device for plasma confinement consists of an endless, closed tube, such as a toroid, with a geometrically coextensive, externally imposed magnetic field (e.g., a toroidal magnetic field) in which magnetic lines of induction extend around the toroid generally parallel to its minor axis. Such a magnetic field is conventionally provided by electrical currents in one or more conductive coils encircling the minor axis of the toroid. Illustrative of such devices are the toroidal diffuse pinch plasma confinement devices of the Tokamak configuration, and such devices may be generally referred to hereinafter as tokamak devices or systems. The toroidal configuration may be advantageously employed with plasmas and plasma confinement systems of noncircular cross section either with respect to planes perpendicular to the minor axis or the major axis such as those involving plasma configurations which are axisymmetrically elongated in a direction parallel to the major toroidal axis. In this connection, U.S. Pat. Nos. 3,692,626 and 3,801,438 illustrate plasma generation and confinement apparatus of the toroidal type having a noncircular cross section in respect of a plane parallel to and intercepting the major toroidal axis.

As previously indicated, toroidal systems for the containment of high-temperature plasmas comprise means for providing a strong, toroidal magnetic field in which the plasma is to be embedded, and which is conventionally provided by electrical current in one or more conductive coils encircling the minor toroidal axis. The term "axis" is used herein to include multiple axes or axial surfaces, such that reference to toroidal systems may include such systems having a noncircular cross section such as utilized in the various Doublet devices of the assignees of the present invention. Toroidal plasma systems, which are hereinafter generally referred to as tokamak systems, may also comprise means for providing a toroidal electrical field to produce a current flowing in the plasma, generally in the direction of the minor axis, and this plasma current in turn may generate a magnetic field component which is poloidal (i.e., the surfaces of constant magnetic flux are closed about the minor toroidal axis). The combination of the poloidal magnetic field produced by the plasma current, with the toroidal magnetic field produced by the toroidal coil current, is suitable for providing helix-like magnetic field lines that generally lie on closed, nested magnetic surfaces. The plasma is accordingly subjected to confining, constricting forces generated, at least in part, by the current flowing in the plasma. The resulting magnetic field provides for a diffused pinching force in the confining magnetic field which may be substantially greater than the outward pressure of the plasma.

The generation of a current in the plasma may conventionally be provided in various ways, such as by providing current in an inductive primary coil configured such that the plasma serves as the secondary coil of a transformer system. Such inductive current further provides for inductive, ohmic heating of the plasma, and systems for additional heating of tokamak plasmas are known in the art.

Experimental results in a variety of tokamaks indicate the importance of operation at high density in the achievement of good plasma confinement [Alcator Group in *Plasma Physics and Controlled Nuclear Fusion Research* (Proc. 5th Int. Conf. Berchtesgaden 1976), Pulsator Group in *Plasma Physics and Controlled Nuclear Fusion Research* (Proc. 5th Int. Conf. Berchtesgaden 1976) IAEA-CN-35A6], and for a given magnetic field, operation at higher density requires the achievement of higher values of $\beta$. Substantially higher values of $\beta$ than obtainable for circular tokamaks may be provided in tokamaks with vertically elongated cross sections. The provision of such elongated, noncircular cross section plasmas, however, involves added complexity (e.g., in connection with shaping the plasma and stabilizing axisymmetric modes) and good plasma shaping conditions involve relatively flat plasma current profiles or the placement of field-shaping coils very close to the plasma [Doublet IIA Group in *Plasma Physics and Controlled Nuclear Fusion Research* (Proc. 6th Int. Conf. Berchtesgaden 1976) IAEA-CN-35/A10-3; Chu, M.S., et al., in *Plasma Physics and Controlled Nuclear Fusion Research* (Proc. 6th Int. Conf. Berchtesgaden 1976) IAEA-CN-35/B11-1]. However, for a fusion reactor system, energy conversion considerations involve the placement of a blanket between the plasma and the field shaping coils, which removes the coils sufficiently far from the plasma that acceptable control of the plasma configuration may require an unrealistically flat current profile.

The utilization of a poloidal magnetic divertor as a means of impurity control involves similar considerations. Considerations of plasma shaping and stabilization of axisymmetric modes require very accurate control of the separatrix position, particularly when the amplitude and/or profile of the plasma current is evolving. Impurity control by means of poloidal divertors is accordingly most difficult during the early phase of the discharge which unfortunately is the time period in which most of the impurity contamination is believed to take place in present-day tokamaks.

Accordingly, improved field shaping systems would be desirable for present generation tokamaks and perhaps ultimately essential for reliable, economical reactor operation. Accordingly, it is an object of the present invention to provide improved field shaping methods and apparatus for tokamak plasma systems. It is a further object to provide such methods and apparatus which may be adapted to a new field shaping concept that is compatible with reactor design considerations and provides added stability to axisymmetric plasma modes and which have improved plasma shaping and control characteristics. It is a further object to provide such methods and apparatus which may be adapted for use in poloidal divertor systems.

These and other objects of the present invention are more particularly set forth in the following detailed description and in the accompanying drawings, of which:

Generally, the present invention is directed to plasma generation and confinement systems of the toroidal type which are adapted to provide an elongated plasma, including those of the doublet (or higher multiplet) type having at least one internal separatrix, which utilize a double-layered field shaping coil system, as will be explained in more detail hereinafter.

Apparatus which may be adapted for performance of the present invention includes various of the elements of toroidal plasma confinement systems desirably of Tokamak design and having a noncircular plasma cross section which is elongated in a direction along the major toroidal axis. Such tokamak systems for the containment of high-temperature plasmas comprise means for providing a strong, toroidal magnetic field in which the plasma ring is to be embedded, and which is generally provided by electrical current in one or more conductive coils encircling the minor toroidal axis. Such systems also comprise means for providing a toroidal electrical field to produce a toroidal current flowing in the plasma, and this plasma current in turn generates a magnetic field component which is poloidal. The combination of the poloidal magnetic field with the toroidal magnetic field produces resultant magnetic field lines that lie on closed, nested magnetic surfaces, and the plasma is subjected to confining, constricting forces generated by the current flowing in it. However, in the present invention a double layer of field shaping coils is provided. One of the layers, which is hereinafter referred to as the "S" coil layer, is disposed relatively close to the plasma, and has a physical contour generally corresponding to the desired outer contour of the plasma. A second, outer coil layer, hereinafter referred to as the "F" coil layer, is provided exteriorly of the "S" coil layer, and may be located behind a blanket layer. The outer coil serves to minimize the current in the inner "S" coil layer, and thus to reduce the power required to maintain the elongated multiplet plasma configuration. The toroidal confinement systems may also include various means to generate, heat or otherwise control the plasma, such as neutral beam injection systems, rf heating systems. Examples of apparatus components which may be utilized in connection with the present invention include component systems of the Doublet III apparatus of General Atomic Company and the ISX tokamak system of Oak Ridge National Laboratory.

Figure 1:
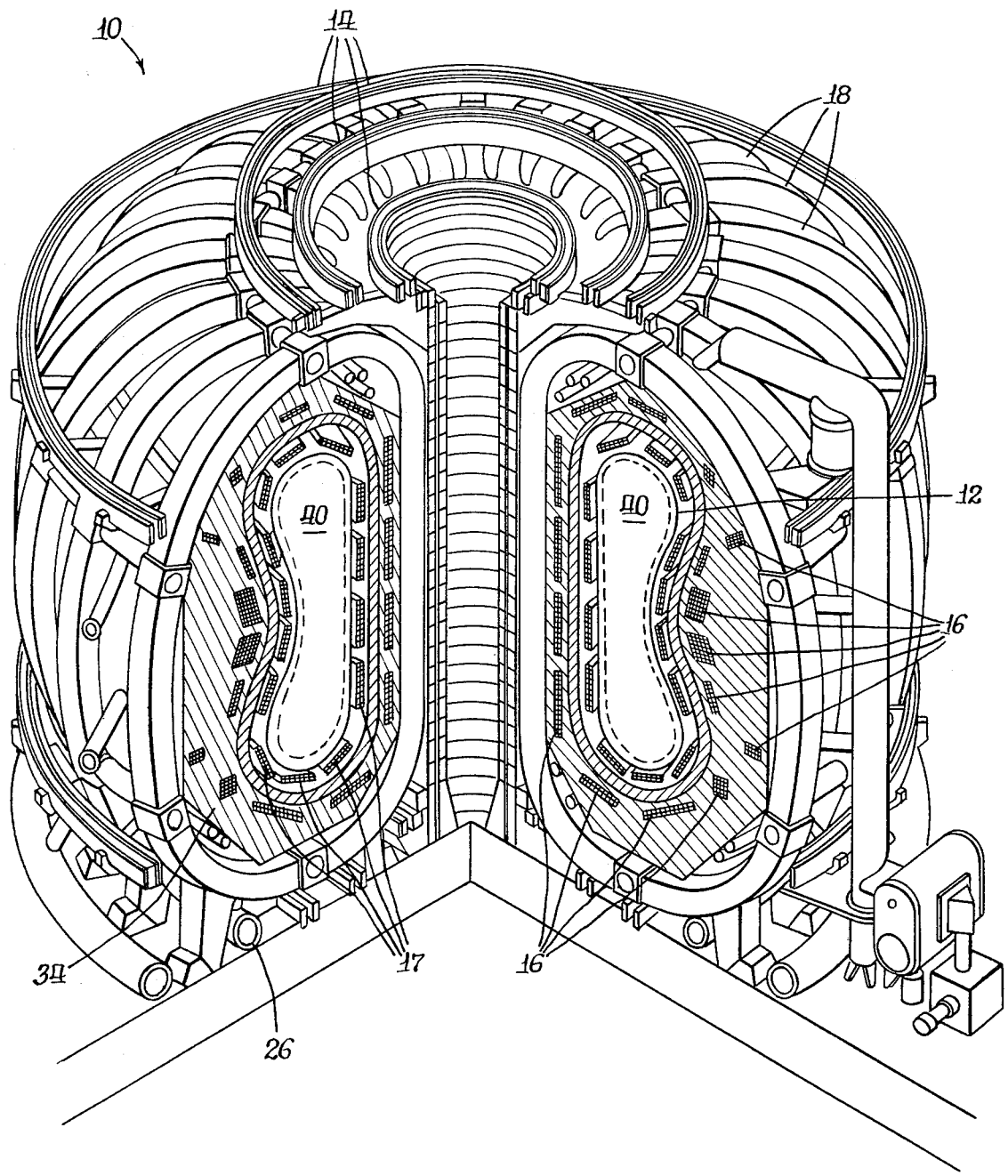
FIG. 1 is a perspective view, partially broken away, of a toroidal plasma system illustrating an embodiment of the present invention.
Figure 2:
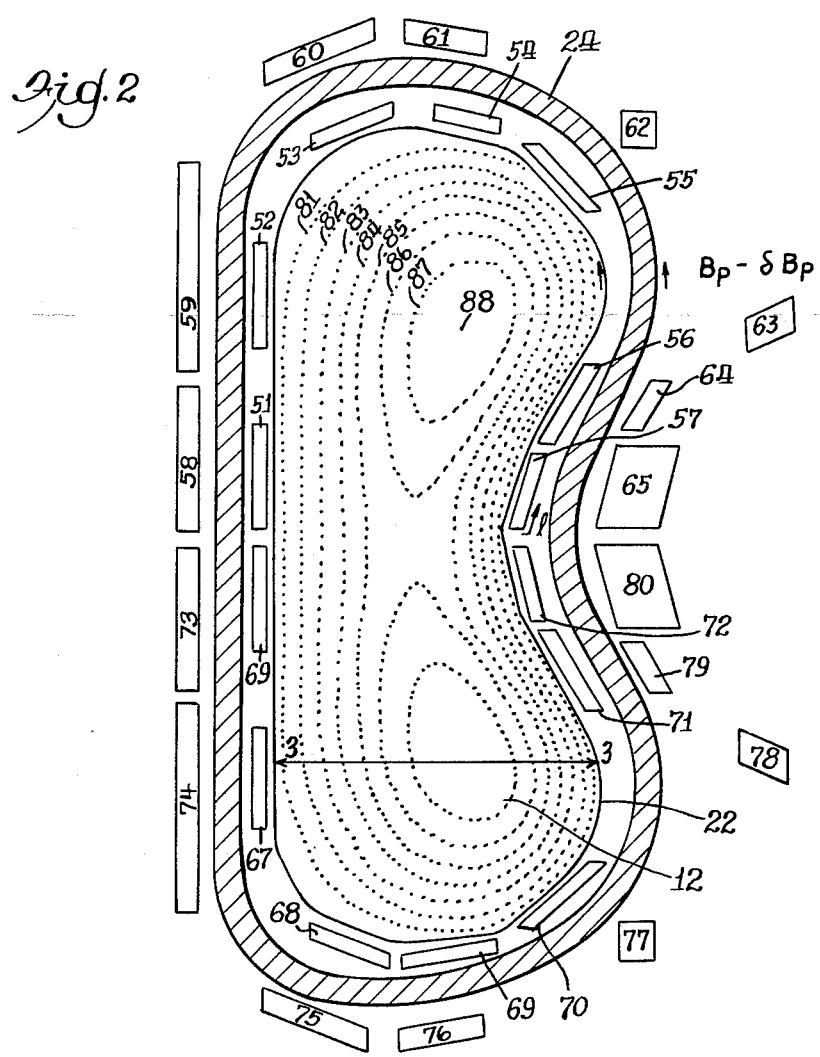
FIG. 2 is a cross-sectional view take through the plane of the plasma chamber of the toroidal plasma system of FIG. 1.

The invention will now be more particularly described with specific reference to the toroidal plasma confinement system 10 illustrated in FIGS. 1 and 2 of the drawings.

The plasma generation and confinement apparatus 10 may be a toroidal fusion reactor for producing high energy neutrons by nuclear reactions occasioned by the fusion of deuterium and tritium nuclei, or may utilize the light hydrogen isotope in provision of a high temperature plasma for study of plasmas or any other use to which hydrogen plasmas may be put. In this connection, the apparatus may be provided with various known apparatus and measurement instrumentation for plasma measurement, testing, and study.

The apparatus 10 has a large toroidal reaction chamber 12 for plasma generation and confinement. A plasma may be created in the interior of the chamber 12 by an appropriate poloidal field, established by E-coils 14. When the E-coils are energized, they produce a time varying magnetic flux linking the chamber 12. The electric field induced by this flux variation initiates and maintains the toroidal discharge current required for plasma confinement and ohmic heating. F-coils 16 and S-coils 17 control the magnetic configuration and position of a plasma discharge in a predetermined manner. The F-coil and S-coil systems establish the magnetic boundary conditions for the plasma 40 in the chamber 12 and may be varied to control the position and other parameters of the plasma 40. Also provided around the chamber 12 are toroidal B-coils 18, which establish an azimuthal magnetic field for stable plasma confinement.

The $\psi$ flux values of a double configuration are shown in more detail in FIG. 2. The plasma zone comprising the predominant amount of plasma (e.g., at least 90% of the plasma mass) may be compared as shown as shaded plasma region in FIG. 1. The indicated flux lines are closed, or continuous, such that charged particles of the plasma 40 which are influenced by electromagnetic forces to follow the flux lines will experience forces tending to confine the plasma in the zone 40.

The plasma conditions are initiated at relatively low pressures. Hence, the chamber 12 is constantly pumped out by vacuum pumps through ports 30 located at the bottom of the vacuum chamber 12.

At the high temperatures which may be produced in the reaction region in appropriate systems, deuterium and tritium nuclei may undergo fusion, producing helium nuclei and high energy neutrons. Such neutrons at energies of about 14 MeV may penetrate the chamber 12 and pass into a blanket 24 surrounding the chamber 12. The blanket 24, which may be formed in part of carbon and lithium and which may include stainless steel or other high temperature metallic structural, blanket and conduit components, may be used for extracting the energy from the neutrons, raising the temperature of the blanket 24. Helium gas or other coolant may be circulated through the blanket 24 from a conduit 26. Cool helium or other coolant is introduced into the conduit 26, and heated helium or other coolant is withdrawn from an outlet conduit. Such coolant provides a safe, yet effective, heat transfer function, carrying heat from the reactor to an external heat exchanger, and recirculated through conduit 26. A radiation shield 34 may be provided to limit the escape of harmful radiation.

The S-coil layer 17 and the F-coil layer 16 work in tandem to shape the plasma cross section and provide for magnetohydrodynamic (MHD) stability of the plasma. In this connection, for purposes of discussion, the S-coil layer and the F-coil layer may be considered to be coil layers, the coils of each of which are spaced sufficiently closely around the plasma cross section to be regarded as substantially circumferentially continuous. The flux value $\psi_S(l)$ at a given point along the S-coil circumference can be expressed as a summation of contributions from the S-coil layer current $\phi_S(l)$, the F-coil layer current $\phi_F(l)$, and the plasma current $\phi_p(l)$, as follows:

$$\psi_S(l) = \phi_S(l) + \phi_F(l) + \phi_p(l) \quad (1)$$

Further, for purposes of illustration, the plasma dynamics of the plasma 40 of system 10 may be regarded as fixed, i.e., the functional form of the plasma current density $j(\psi,R)$ is specified. In this case, the MHD equilibrium is determined substantially entirely by $\psi_S(l)$, the $\psi$-values on the S-coil layer. Even if the F-coil currents change, the plasma equilibrium is not altered provided $\psi_S(l)$ is held fixed; in this case, the S-coil currents automatically adjust in such a way that quantity $\bar{\phi}(l) = \phi_S(l) + \phi_F(l)$ remains invariant. Another way of stating this is that the plasma configuration is substantially identical for any combination of current distributions in the two coil layers giving rise to the same $\bar{\phi}(l)$. In particular, if the current in the F-coil layer is selected to satisfy $\phi_F(l) = \bar{\phi}(l)$, it follows that $\phi_S(l) = 0$, i.e., that substantially no current flows in the S-coil layer 17. For this solution, the S-coil system has no substantial effect on the equilibrium. However, this does not mean that the S-coils are superfluous; indeed, only stable equilibria can exist in a real device and the S-coils provide a powerful feedback mechanism to inhibit the growth of plasma deformations. Vanishing S-coil currents also imply vanishing ohmic loss in these coils, i.e., the power dissipated in the inner coil layer can, in principle, be made as small as desired.

In the illustrated apparatus 10, each of the F and S-coil layers are a set of discrete coils. As long as the characteristic lengths, namely the widths and heights of the coils and the gaps between adjacent coils, are much smaller than the plasma minor radius, the previous discussion in connection with a continuous coil layer is still accurate. In the discrete coil system as provided in the illustrated embodiment, the relation involving the substantially invariant quantity $\bar{\phi}(l) = \phi_S(l) + \phi_F(l)$ is represented as:

$$\bar{\phi}^{(i)} = \sum_j M_{SS}^{ij} I_S^j + \sum_j M_{SF}^{ij} I_F^j \quad (2)$$

where $I_S^j$ and $I_F^j$ are the currents in the jth S-coil, and the jth F-coil, respectively. The matrices $M_{SS}$ and $M_{SF}$ comprise the mutual inductances between the various coils.

In order to maximize the neutron energy deposited in the blanket, the S-coil layer should be made thin. Hence it is desirable that the F-coil currents should be chosen such that $I_S$ is substantially equal to zero. Noting that the quantity $\bar{\phi}$ is an invariant, it follows that the currents $(I_S, I_F)$ in any solution are related to those of an ideal solution $(O, \tilde{I}_F)$ by the following relationship:

$$\sum_j M_{SS}^{ij} I_S^j = - \sum_j M_{SF}^{ij} (I_F^j - \tilde{I}_F^j) \quad (3)$$

A solvability condition for the existence of an ideal solution is that the number of F-coils be at least as large as the number of S-coils. It will be appreciated that equation (3) can be used for minimizing the S-coil currents in actual tokamak operation of a system such as the illustrated embodiment 10. The mutual inductances are purely geometrical quantities and can be determined accurately in accordance with conventional practice. A measurement of the S-coil currents $I_S^j$ may then be utilized to readily compute how much the F-coil currents should be changed ($\Delta I_F = I_F - \tilde{I}_F$) in a given coil configuration to generate an ideal solution. By this procedure, $I_S$ can, in principle, be made as small as desired.

As indicated, the apparatus 10 is provided with a double layer field shaping coil system, which in the illustrated embodiment is adapted to provide a doublet plasma configuration and which comprises an inner S-coil layer 7 and an outer F-coil layer 16. The inner S-coil layer 17 is located immediately behind the chamber 12, and the coils of the layer 17 are termed S-coils because their primary function is to stabilize the plasma 40. The S-coils 17 are thin enough to transmit the vast majority of the neutron flux which may be generated in the chamber 12. The outer set of coils 16 is located behind the blanket 24. Since these coils 16 provide the conventional field shaping function, they are termed F-coils [Schupp, A. A., et al., 5th Symp. Engrg. *Problems of Fusion Research* (Proc. Symp. Princeton, N.J. 1973) IEEE, New York (1974) 570].

The proximity of the S-coils to the plasma is important in providing the plasma stabilization function. Because it is the poloidal fluxes on the S-coils that are programmed, plasma motion will induce image currents in the S-coils which provide strong restoring forces to suppress such potential instabilities. Maintaining the desired $\psi$ values on the S-coils for the desired plasma configuration does require power because of the ohmic losses in the coils.

As indicated, the S-coil layer should be thin enough to transmit the great majority of the neutron flux, but this must be balanced by the requirement that the ohmic losses in the coils not be excessive. Accordingly, one role of the outer (F-coil) system is to reduce the current in the inner (S-coil) system, i.e., to reduce the power required to maintain the plasma configuration. In accordance with aspects of the present invention, careful tailoring of the $\psi$ values (or currents) of the F-coils substantially reduces the current in the S-coils and consequently reduces the ohmic loss in the combined field shaping system. This interactive function provides for the capability of utilizing thin S-coil layers while retaining the ability to maintain the desired plasma configuration.

In connection with the power requirement for maintaining the desired plasma configuration the current density in the S-coils may be generally represented by:

$$j \approx \delta B_p / \mu \Delta \quad (4)$$

where $\delta B_p$ is the poloidal field difference across the coil and $\Delta$ is the thickness of the coil. The total ohmic loss in the S-coils may accordingly be represented as follows:

$$P_{ohm} = 2\pi R_o \, 2\pi a \left( \frac{1 + \kappa^2}{2} \right)^{\frac{1}{2}} \Delta j^2 / \sigma \quad (5)$$

where $\kappa$ is the height to width ratio of the plasma, $\sigma$ is the conductivity of the S-coil material, and $R_o$ and $a$ are the plasma major and minor radii, respectively.

The ohmic power loss $P_{ohm}$ of a nonsuperconducting S-coil layer does not significantly alter the overall energy balance or the heat load on the vessel 12 provided that $$P_{ohm} \text{ is less than } (1/10)V(3nT/\tau_E) \tag{6}$$

where V is the plasma volume, n and T are the plasma density and temperature (which may be regarded to be substantially equal for electrons and ions), and $\tau_E$ is the energy confinement time. This condition implies a lower bound $\Delta_o$, for the S-coil thickness, which may be represented as $$\Delta > \Delta_o = \frac{80}{3} \delta^2 \cdot \frac{1}{\beta_p} \cdot \frac{\tau_E}{\mu \sigma a} \cdot \left(\frac{1+\kappa^2}{2\kappa^2}\right)^{\frac{1}{2}} \tag{7}$$

where $\delta \equiv \delta B_p/B_p$. For representative values of $\delta$, $\tau_E$, a, $\beta_p$ and $\kappa$ ($\delta = 0.05$, $\tau_E = 2$ sec, $a = 1$ m, $\beta_p = 2$, and $\kappa = 3$), the coil thickness may be calculated as follows:

$$\Delta_o \approx 7 \cdot (\sigma_{cu}/\sigma) \cdot 10^{-2} \text{ cm} \tag{8}$$

where $\sigma_{cu}$ is the conductivity of copper at 20° C.

An acceptable limit on nuclear heating, i.e., a limit on the degradation of the heat to the blanket, determines an upper bound $\Delta_n$ on the coil thickness. Thus, a condition on the S-coil material may be provided, such that the upper bound thickness $\Delta_n$ is greater than $\Delta_o$ as expressed in equation (8), a condition that is easily satisfied by many available materials. The choice of S-coil material can thus be made on the basis of other favorable attributes such as low neutron activation and long useful S-coil life.

Practical tokamak plasma systems require relatively simple coil systems, and the practice of the present invention permits the utilization of relatively simple coil systems without substantial deterioration of plasma performance. FIG. 2 illustrates a typical design for a Doublet configuration, the latter being generated by the General Atomic MHD code [Chu, M. S., et al., Phys. Fluids, 17, 1183 (1974)]. As illustrated in FIG. 2, the S-coil layer 17 comprises seven coil groups 51–57 at the upper half of the chamber 12 and seven coil groups 66–72 symmetrical therewith at the lower half of the chamber 12. The F-coil layer 16 similarly comprises coil groups 58–65 for the upper chamber half and symmetrical coil groups 73–80 for the lower chamber half. The S-coil layer 17 of FIG. 1 need not necessarily poloidally surround the plasma completely because their primary role is to stabilize the axisymmetric modes. The relatively large gaps (e.g., between coils 55 and 56) near the elliptical axes of the plasma configuration have little effect on the stabilizing properties of the S-coil system against the most dangerous mode in the Doublet configuration, namely, the Doublet-droplet and Doublet-ellipse modes [Doublet IIA Group in *Plasma Physics and Controlled Nuclear Fusion Research* (Proc. 6th Int. Conf. Berchtesgaden 1976) IAEA-CN-35/A10-3]. These gaps provide sufficient access for vacuum pumping and auxiliary heating ports. Access is also desired into the plasma chamber 12 to meet maintenance requirements. Such access port may be provided between coils 61 and 62, but access to the chamber may involve disassembly of coils 54 and 55. These coils, and indeed all inner coils, can have a simple structure with only a few turns because the current passing through them is small. Such a simple structure also ameliorates the difficult problem of design coils to withstand the intense neutron dosage.

The most straightforward way of biasing the S-coils 51–57, 66–72 is to connect them in parallel. Each S-coil may have its own low impedance power supply to program the $\psi$ value and to overcome the resistive losses. The biasing of the F-coils is very flexible. They no longer need to provide a stabilizing effect, so either their currents or their flux values may be programmed to desired values in accordance with conventional practice. Accordingly, the F-coils may be appropriately connected in any combination of series or parallel configurations. An algorithm to minimize the S-coil currets of the type discussed in connection with Equation (3), which dealt implicitly with an F-coil system in which the currents were programmed, can easily be constructed for any such biasing arrangement.

In connection with the tolerance in the F-coil biasing required to reduce the S-coil currents to small values, the most difficult S-coil currents to minimize in the embodiment of FIG. 2 are those of the outside midplane coils 57 and 72. These are minimized primarily by adjusting the current or $\psi$ value of F-coils 65 and 80. It is found that the quantity $\delta$ shown in FIG. 2, where $B_p$ is the poloidal field immediately inside the S-coil layer, and $B_p - \delta B_p$ is the poloidal field immediately outside the S-coil layer, may be represented as:

$$\delta = \left|\frac{\Delta I_S^{57}}{I_S^*}\right| = 0.5 \cdot \left|\frac{\Delta I_F^{65}}{\bar{I}_F^{65}}\right| \tag{9}$$

where $I_S^*$ is the total plasma current divided by the number of S-coils ($I_p/14$ in apparatus 10, where $I_S$ and $I_F$ represent the coil current of the respective S and F coils of FIG. 2 designated by the respective superscript numeral). This represents crudely the average current expected in the S-coil if the F-coils are disconnected. As before, $\bar{I}_F^{65}$ is the F-coil current corresponding to an ideal solution, specifically one with $I_S^{57} = 0$. The second equality of Equation (9) states that if $I_F^{65} = \bar{I}_F^{65} \pm I_F^{65}/2$, then $I_S^{57} = \pm \Delta I_S^{57}$. A value of $\delta$ approximately equal to 0.05 is quite satisfactory, and only requires that the F-coil current adjustment must be accurate to within 10%; this is a very modest requirement. In the early phase of a tokamak plasma discharge during which the amplitude and profile of the plasma current are evolving, even values of $\delta$ as large as about 0.3 may be acceptable, because of the smaller plasma current and the short time involved. Furthermore, it is found that even if the plasma current changes from flat to moderately peaked profiles and no adjustments are made on either set of F-coils, only small S-coil currents are induced. However, when the plasma current channel shifts radially outward as a result of the increase of the plasma $\beta$, the value of $\psi_F$ (or $I_F$) should be adjusted by appropriate programming of the F-coil currents over the time of the discharge to reduce $I_S$ to an acceptable level.

In the illustrated embodiment of FIG. 2, flux contours 81–88 are shown for a poloidal plasma current $I_p$ of 10 megamperes, a major plasma radius R of 3.4 meters, a minor plasma radius of 0.9 meters, and a plasma elongation $\kappa$ of 2.51. The respective coil $\psi$ and current values, and the plotted flux values for the upper half coils are as follows:

| Plotted | Flux | |
|---|---|---|
| 81 | 4.977E − 01 | (V-sec) |
| 82 | 8.023E − 01 | |
| 83 | 1.197E + 00 | |

-continued

| | | |
|---|---|---|
| 84 | 1.412E + 00 | |
| 85 | 1.716E + 00 | |
| 86 | 2.021E + 00 | |
| 87 | 2.326E + 00 | |
| 88 | 2.630E + 00 | |

| COIL | $\psi/2\pi$ | CURRENT |
|---|---|---|
| 51 | 2.000E − 01 | 3.51748E + 03 |
| 52 | 2.000E − 01 | 2.17580E + 03 |
| 53 | 4.263E − 14 | 7.23782E + 02 |
| 54 | 7.816E − 14 | 6.66949E + 03 |
| 55 | 1.066E − 13 | −8.43252E + 03 |
| 56 | −2.000E − 01 | −7.05828E + 03 |
| 57 | "4.000E − 01 | 6.65481E + 03 |
| 58 | −6.900E − 01 | −1.15814E + 06 |
| 59 | −4.700E − 01 | −9.75615E + 05 |
| 60 | −6.200E − 01 | −3.41458E + 05 |
| 61 | −1.100E + 00 | −5.61477E + 05 |
| 62 | −2.200E + 00 | −7.02077E + 05 |
| 63 | −3.500E + 00 | −5.55020E + 05 |
| 64 | −1.900E + 00 | 7.43356E + 05 |
| 65 | −5.500E + 00 | −2.58361E + 06 |

Figure 3:
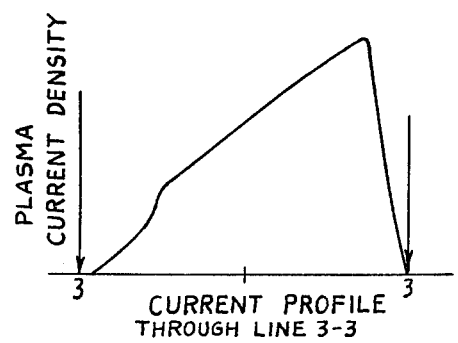
FIG. 3 is a graph showing the current profile of the cross section of the plasma of FIG. 2 taken through line 3—3.

The coils in the lower half are symmetrical with these values. The current profile across the lower half of the plasma, through line 3—3, is shown in FIG. 3.

Improved divertor systems may also be implemented through the use of the double layer coil structure of the present invention. In this connection, typical divertor designs are hampered by a number of drawbacks, among which are the difficulty of controlling the position of the separatrix, and the large current flowing in the divertor coil. In some conventional designs, the current flowing in the divertor coil may actually be larger than the plasma current. The separatrix-control difficulty limits impurity control particularly during the crucial startup phase. The relatively large divertor current presents technological problems and also means that a larger parasitic loss term will be present; the latter is a potentially serious obstacle to the achievement of net power.

With the adoption of a close-fitting field shaping "S" coil system, such as is made possible by use of the double coil layers, these divertor design problems can be minimized. Because the S-coils are very close to the plasma, they are extremely effective in controlling the outer flux surfaces, which in the case of divertor systems includes control of the position of the divertor separatrix. Furthermore, such a system acts more locally than a typical field shaping coil system. Hence, the desired shaping can be obtained with the minimum deformation of the global plasma configuration and with the minimum divertor current.

A divertor system of the type described is illustrated in plasma cross section in FIGS. 4–9. For simplicity, only the inner layer of the double layer of coils has been depicted, it being understood that an outer "F" coil layer may be provided as previously described and that other tokamak elements may be provided in accordance with conventional practice. The outer F-coils of the apparatus of FIGS. 4–9 do not alter the plasma configuration; they are biased so as to minimize the currents in the inner layer.

The apparatus 100 of FIGS. 4–9 includes S-coils 101–117, which provide for a region 120 at the upper end of the plasma chamber 122. The flux lines defining the plasma configuration are illustrated in the same manner as in FIG. 2. Only the upper chamber half is shown, also for economy of illustration, it being appreciated that principles of symmetry may be applied for the lower half. It should be noted that the divertor coils are twofold. The small coil 109 (with current value $I_{109}$) on the plasma side of the primary divertor coil 108 provides a fine tuning for adjusting the position of the separatrix. It also provides added stabilization against the axisymmetric modes. It is found that divertor coil currents of $I_D = I_{108} \approx 1$ MA and $|I_{109}| \leq 50$ kA are sufficient to generate a divertor separatrix for a plasma with poloidal current $I_p$ of about 10 MA. Accordingly, this design provides dramatic savings in cost for comparable plasma performance over previous divertor designs, where the divertor coil current is of the same order as the plasma current.

Figure 4:
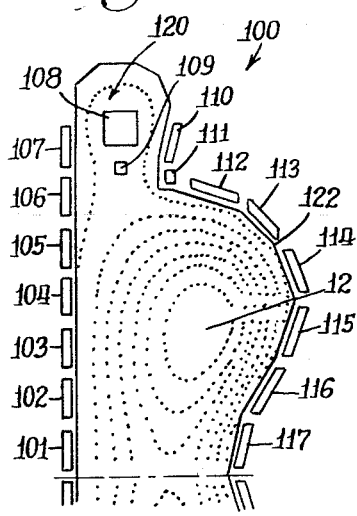
FIGS. 4–9 are partial cross-sectional views of an embodiment of the invention utilizing a poloidal divertor.
Figure 5:
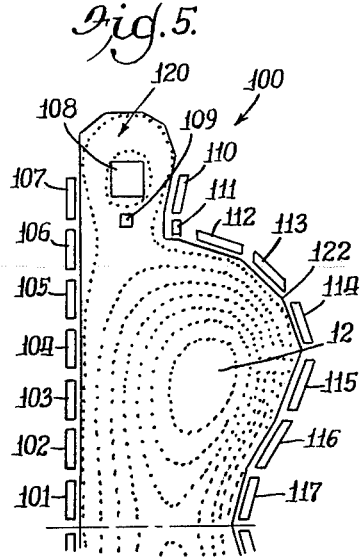
Figure 6:
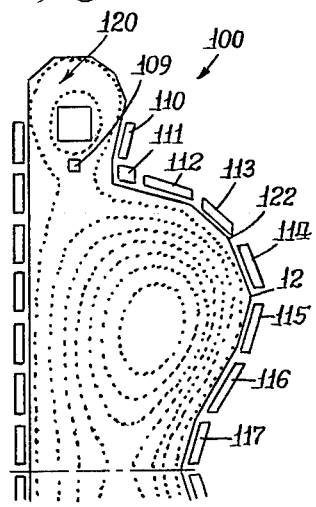

The control aspects of such a design are illustrated in FIGS. 4–12. FIGS. 4–6 show the sensitivity of divertor performance of the apparatus 100 to the divertor $\psi$ value, $\psi_D$. Illustrations 4, 5, and 6 respectively show the flux plots for $\psi_D$ equal to the $\psi$ value at divertor coil 108 (i.e., $\psi_{108}$), each equal to 5.7, 7.5, and 9.4 volt-seconds respectively and the corresponding divertor current $I_D$ (i.e., the current $I_{108}$ of coil 108) equal to 0.78, 1.11, and 1.43 MA in the illustrated system 100.

Figure 7:
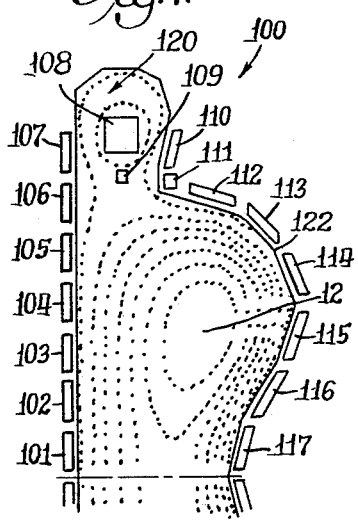
Figure 8:
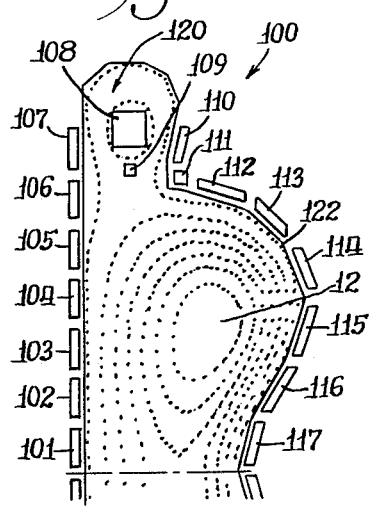
Figure 9:
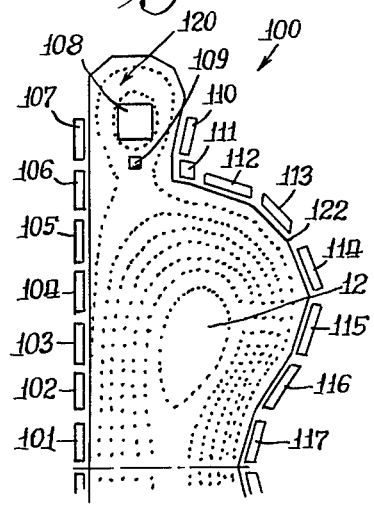
Figure 10:
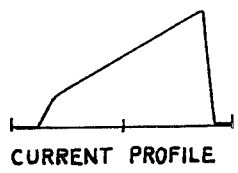
FIGS. 10–12 are graphs showing the effect on divertor performance of variations in the plasma current profiles of FIGS. 7–9.
Figure 11:
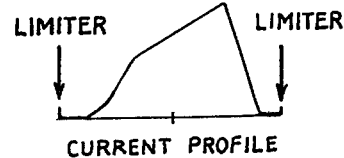
Figure 12:
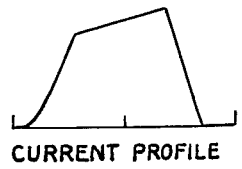

FIGS. 7–9 show the effect on divertor performance of variations in the respective plasma current profiles shown therebelow in FIGS. 10–12 (for the respective flux plot above the respective-current profile). This illustrates the stability of the divertor performance of the double layer divertor system. FIGS. 4, 5, and 6 illustrate that successful divertor operation can take place over a wide range of values of $\psi_D$, the divertor coil value (in these runs, all shaping parameters are fixed except $\psi_D$). FIGS. 7, 8, and 9, and the corresponding current profile plots of FIGS. 10, 11, and 12, show that the divertor configuration is relatively insensitive to the plasma current profile. The only "tracking" necessary in generating equilibria for these various profiles is a series of small modifications of the outer midplane $\psi$ value, $\psi_{117}$, needed to produce good Doublet equilibria.

Apparatus and methods in accordance with the present invention have particular utility in the study and analysis of the properties and behavior of plasmas. The illustrated embodiment is particularly adapted for use in the generation, confinement, study, and analysis of hydrogen plasmas (i.e., hydrogen, deuterium, tritium, and mixtures thereof such as deuterium-tritium mixtures) at high temperature and high beta tokamak magnetic confinement conditions, although the invention may also be used in the production, study, and utilization of plasmas containing highly stripped elements of higher atomic number. Accordingly, the methods and apparatus of the present invention find utility as analytical techniques and instrumentation in respect of matter in the plasma state. In this connection, the apparatus may be provided with conventional diagnostic and measurement elements including magnetic probes, inductive pickup loops, particle detectors, photographic and spectrographic systems, microwave and infrared detection systems, and other appropriate elements, the data outputs of which may be utilized directly or recorded, such as by transient data recorders.

Accordingly, it will be appreciated that improved tokamak plasma systems have been provided in accordance with the present invention. The double layer field shaping coil system provides for satisfactory plasma shaping and control, and is compatible with the requirements of reactor design. In a double layer field shaping coil system of the tokamak type, the plasma chamber takes the shape of the desired plasma configuration. The S-coils, situated immediately outside the plasma chamber, are very close to the plasma, thus significantly improving both equilibrium and stability. In this manner, the desired plasma configuration may be obtained even if the current profile exhibits considerable peaking. Another application of this concept permits simpler and more effective divertor designs, as previously discussed.

While the present description has been directed to specific embodiments of doublet plasma configurations, and doublet plasma configurations with associated divertor systems, it will be appreciated that various modifications and adaptations may be derived from the present disclosure. In this connection, higher multiplet plasma configurations with a plurality of internal separatrices may be provided. Furthermore, it will be appreciated that double layer field shaping systems in accordance with the present invention are fully compatible with a variety of other plasma cross-sectional shapes, such as dee shapes, elliptical shapes, and circular shapes, in addition to multiplet shapes.

Various of the features of the invention are set forth in the following claims.

I claim:

1. Apparatus for generation and confinement of a toroidal plasma of noncircular cross section having major and minor toroidal axes, with the plasma being elongated in the direction of the major toroidal axis, comprising means for providing a toroidal magnetic field for plasma confinement in a plasma confinement zone, means for providing a toroidal current in the plasma for generation of a poloidal magnetic field, a field shaping coil system for shaping the plasma cross section to stabilize the plasma and axisymmetrically with respect to the major toroidal axis to elongate the plasma in a direction along the major toroidal axis comprising an inner stabilizing coil system having a coil layer comprising a plurality of inner S coil elements aligned to conduct in a direction generally along the direction of the minor toroidal axis and disposed adjacent to and surrounding the plasma confinement zone with a physical contour generally corresponding to the desired elongated outer contour of the plasma, and an outer field shaping coil system having a coil layer comprising a plurality of outer coil elements aligned to conduct in a direction generally along the direction of the minor toroidal axis and being separated from the disposed exteriorly of the inner coil layer the electrical currents $I_S$ of said inner coil elements and the electrical currents $I_F$ of said outer coil elements being related in each of the coil elements as follows:

$$\sum_j M_{SS}^{ij} I_S^j = - \sum_j M_{SF}^{ij} (I_F^j - \bar{I}_F^j)$$

where $I_S^j$ is the current in the jth S coil element, $I_F^j$ is the current in the jth F coil element, $\bar{I}_F^j$ is the current in the jth F coil element for which all S coil electrical currents are zero, $M_{SF}^{ij}$ is the mutual inductance between the ith S coil element and the jth F coil element, and $M_{SS}^{ij}$ is the mutual inductance between the ith S coil element and the jth S coil element and, programming means for controlling the currents in the F coil elements of said outer coil layer to minimize the currents $I_S^j$ in the S coil elements of the inner coil layer during plasma generation and confinement.

2. Apparatus in accordance with claim 1 wherein said field shaping coil system is adapted to provide a doublet or higher multiplet cross sectional plasma configuration having one or more internal separatrices.

3. Apparatus in accordance with claim 1 wherein said field shaping coil system is adapted to provide a dee shape cross sectional plasma configuration.

4. Apparatus in accordance with claim 1 wherein said field shaping coil system is adapted to provide an elliptical shape cross sectional plasma configuration.

5. Apparatus in accordance with claim 1 wherein said inner coil layer and said outer coil layer are separated by a neutron blanket structure, and wherein said inner coil layer is adapted to transmit the principal proportion of incident neutron flux.

6. Apparatus in accordance with claim 1 wherein the coil elements of the inner coil layer are parallel-connected with each inner coil layer element being provided with a separately controllable power supply.

7. Apparatus in accordance with claim 1 comprising means for programming the respective flux values of the coil elements of the inner field shaping coil layer to provide predetermined flux values.

8. Apparatus in accordance with claim 1 wherein said programming means comprises means for separately programming the respective currents or flux values of the coil elements of the outer field shaping coil layer.

9. Apparatus in accordance with claim 1 wherein the plasma configuration includes a poloidal divertor zone adjacent to the plasma zone in a direction along the major toroidal axis, provided by a divertor separatrix, and wherein said inner and outer coil layers are disposed surrounding said divertor zone for controlling the position of the divertor separatrix.

10. Apparatus in accordance with claim 1 wherein the number of said coil elements of said outer field shaping coil system is at least as large as the number of said coil elements of said inner stabilizing coil system, and wherein a neutron absorbing blanket structure is provided between said inner stabilizing coil layer and said outer field shaping coil layer.

* * * * *